(12) United States Patent
Ellis et al.

(10) Patent No.: US 6,370,773 B1
(45) Date of Patent: *Apr. 16, 2002

(54) APPARATUS FOR MAKING SELF-GRIPPING AIR TURNING VANES

(76) Inventors: Stanley J. Ellis, 2602 Courtland St., Orange, CA (US) 92667; Donald H. Siiter, 4757 Cardena Plz., Yorba Linda, CA (US) 92886

( * ) Notice: Subject to any disclaimer, the term of this patent is extended or adjusted under 35 U.S.C. 154(b) by 0 days.

This patent is subject to a terminal disclaimer.

(21) Appl. No.: 09/129,507

(22) Filed: Aug. 5, 1998

(51) Int. Cl.[7] ................................. B23P 15/00
(52) U.S. Cl. ..................... 29/889.7; 29/23.51
(58) Field of Search ............... 29/23.51, 889.7, 29/331 C, 889.21

(56) References Cited

U.S. PATENT DOCUMENTS 3,762,210 A * 10/1973 White ................. 29/23.51
5,960,543 A * 10/1999 Moon ................. 29/23.51

* cited by examiner

Primary Examiner—I Cuda Rosenbaum
(74) Attorney, Agent, or Firm—William L. Chapin

(57) ABSTRACT

A method for making air turning vanes each having formed therein a pair of locking protuberances which adapt the vanes to self-gripping attachment between a pair of rails to fabricate an air turning vane and rail assembly utilizes an elongated length of double plate airfoil vane stock including a front plate having an outer concave surface arcuately bowed about the central longitudinal axis of the plate, and a rear plate having an outer concave surface arcuately bowed about the central longitudinal axis of the rear plate. A vane of a desired length is severed from the vane stock, and the outer concave surface of the rear vane plate is impacted by a punch with sufficient force to deform from the inner surface of the plate a generally hemispherically-shaped button having a lower severed wall which forms a locking lip. The apparatus according to the present invention includes a guillotine-like shearing structure/vane stock support fixture which vertically slidably supports shear blade. The fixture has through front and rear walls thereof longitudinally aligned, crescent-shaped apertures for longitudinally slidably receiving vane stock. A pair of longitudinally aligned, downwardly pointing punches attached to the front and rear surfaces of the shear blade, rearward or upward from a wedge-shaped piercing point of the shear blade, are effective in forming a locking protuberance forward of the rear transverse edge of a severed vane, and a locking protuberance in the vane stock, rearward of the front transverse edge of the vane stock, when the shear blade is forced sharply downward to sever a vane from a length of vane stock.

14 Claims, 10 Drawing Sheets

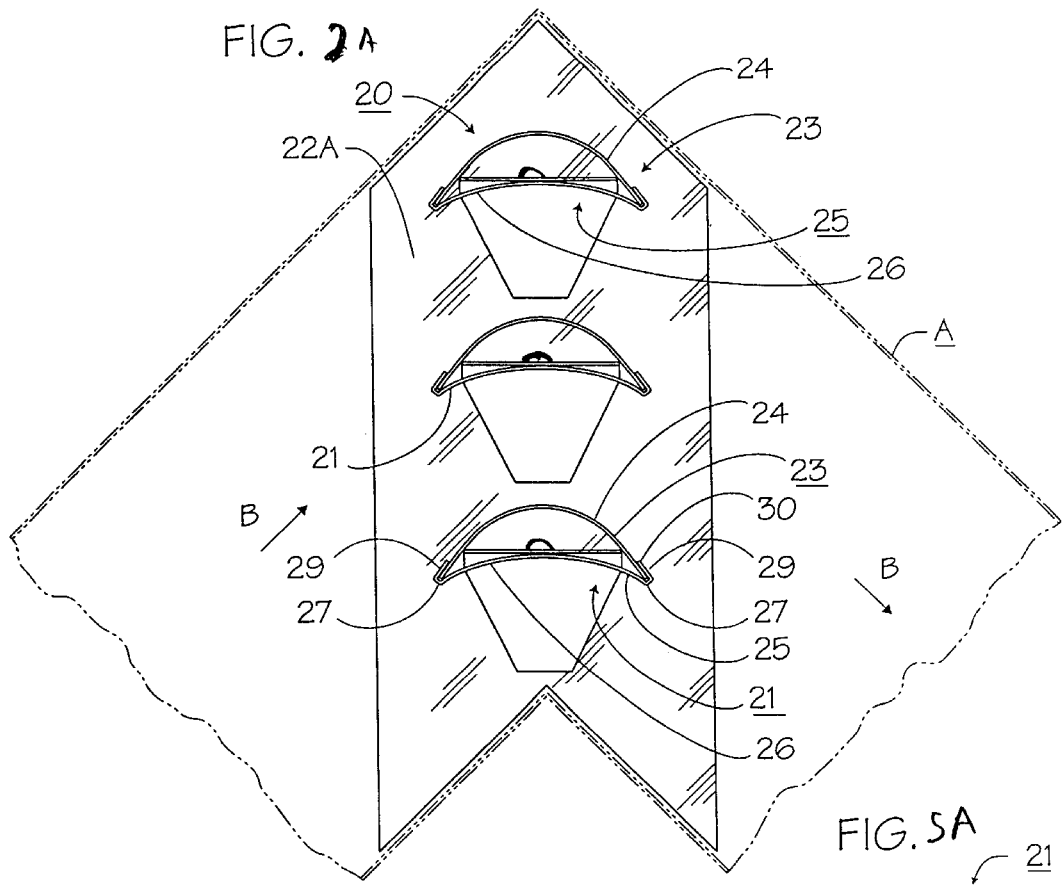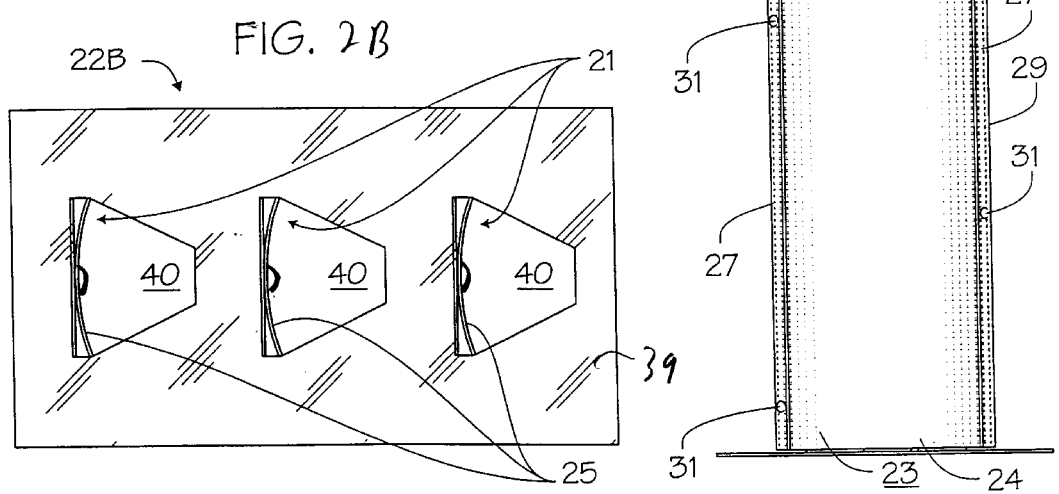

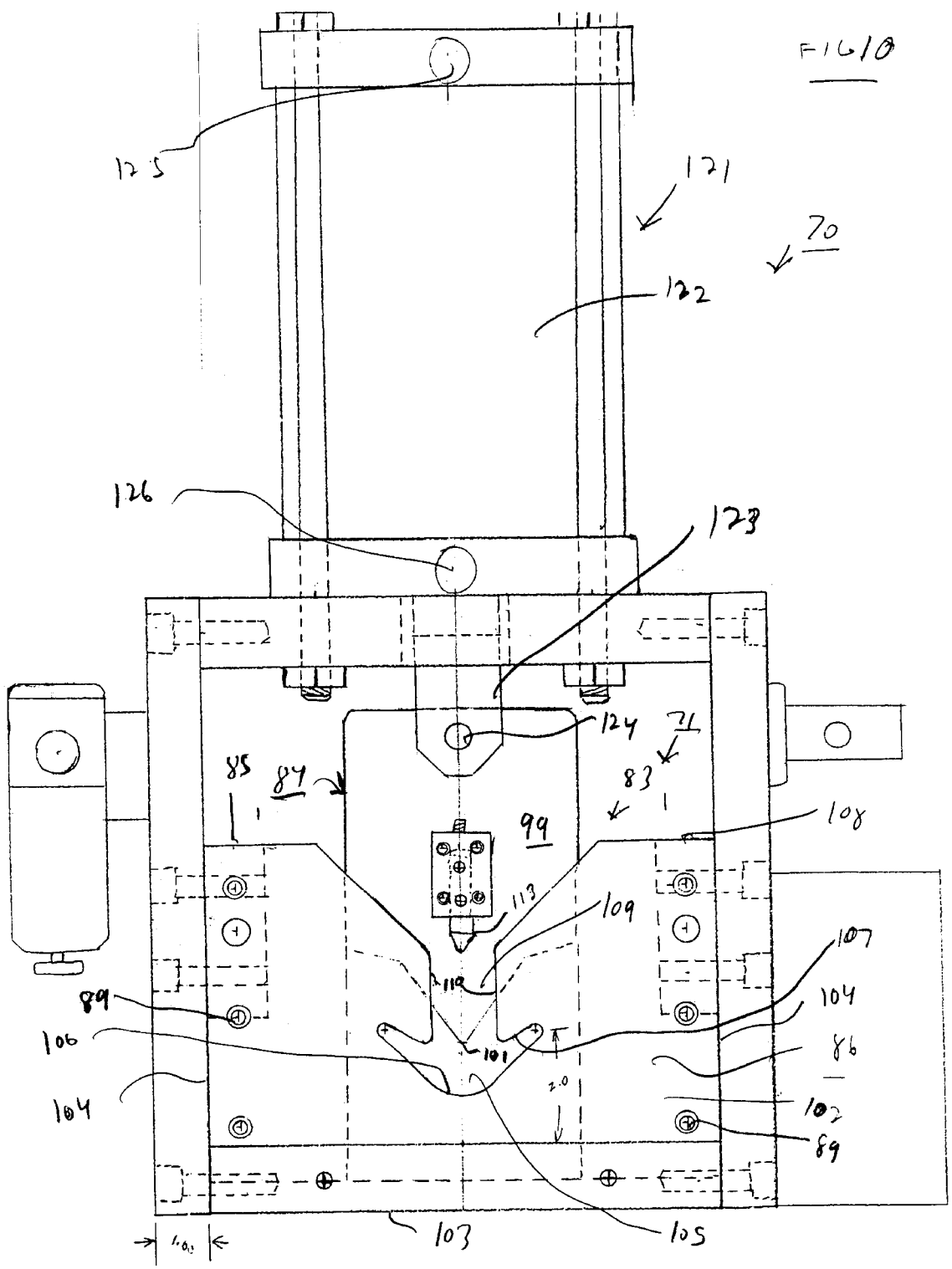

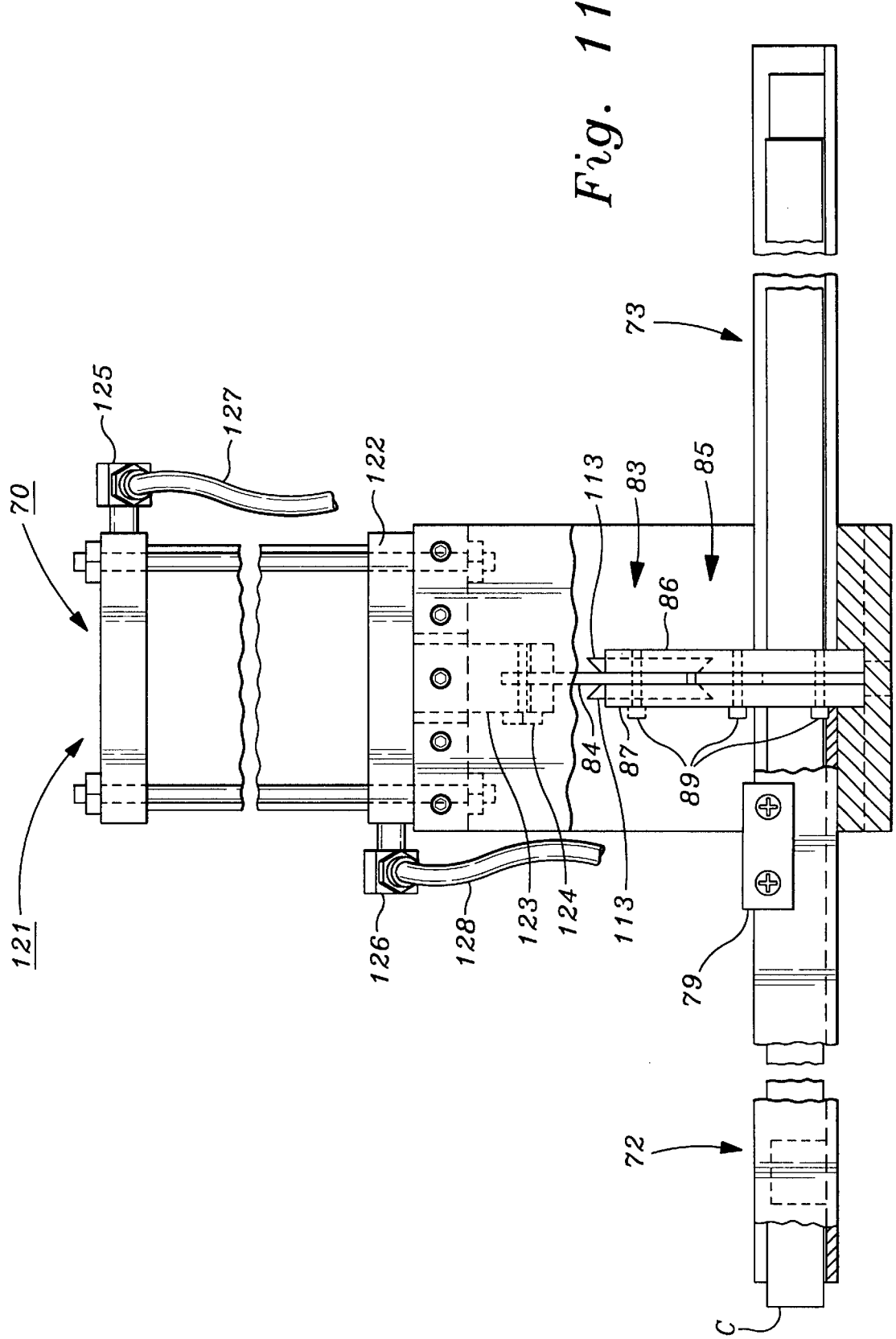

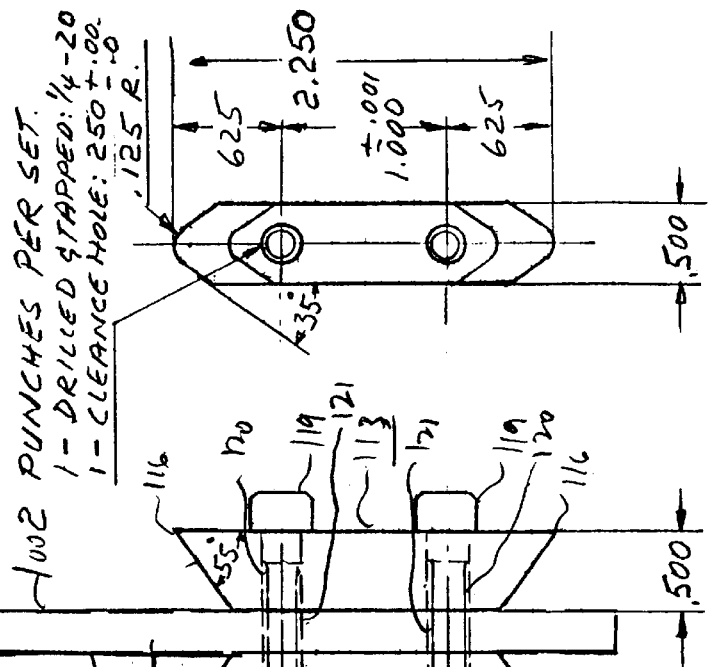

APPARATUS FOR MAKING SELF-GRIPPING AIR TURNING VANES

BACKGROUND OF THE INVENTION

A. Field of the Invention

The present invention relates to duct work used to convey air for heating, ventilating or air conditioning commercial, industrial and residential buildings. More particularly, the invention relates to a method and apparatus for making self-gripping air vanes provided with button-like protuberances which adapt the vanes to be lockingly fastenable to a pair of opposed air turning rails without tools to form a complete air turning assembly.

B. Description of Background Art

Flowing air used to ventilate, heat, or cool buildings is typically routed through a network of interconnected, elongated, straight rectangular cross-section tubes or ducts, which are collectively referred to as duct work. Changes in the orientation or directional bearing of ducts is usually effected by coupling a pair of ducts together with an angled transition section or elbow. These are bent at an angle, typically of 90 degrees, and have rectangular or circular openings for attachment to separate ducts oriented at the particular bend angle with respect to one another.

When air flowing through a duct impacts the side wall of an elbow or transition section disposed perpendicularly to the flow direction, substantial turbulence is created in the flowing air mass, even when the flow velocity is relatively modest. This turbulence impedes air flow, causing an increase in static pressure and pressure loss coefficients, thus necessitating the use of larger blowers that consume increased drive power, to maintain a given air flow rate at the outlet of the elbow section. Moreover, undesirable vibration and noise may be generated within the duct work, if the turbulence is sufficiently great.

For the reasons stated above, ventilation elbows or transition sections are often constructed to include means for minimizing turbulence, usually by encouraging laminar flow within the elbow. Thus, ventilation elbows constructed to minimize turbulence typically employ a plurality of curved, parallel blades or turning vanes spaced apart at regular intervals, to promote laminar air flow where the direction of air flow changes within the elbow. Typical turning vane assemblies use a plurality of curved sheet metal vanes disposed between a pair of flat, parallel metal sheets, often referred to as rails. The assembly is secured within an angled transition section or elbow.

Turning vane assemblies which employ a variety of techniques for fastening turning vanes to rails has been disclosed in the following United States patents:

Steffens, U.S. Pat. No. 2,292,246, Aug. 4, 1942, Duct Turn: Discloses curved double wall non-metallic duct turns or vanes having a metal insert with a tab that fits into slots cut longitudinally inward from the diagonal end wall of a duct shell, the tab having a protruding finger which is bent flush with the diagonal end wall.

Speiser, U.S. Pat. No. 2,826,221, Mar. 11, 1958, Duct Devices: Discloses duct devices that utilize vanes in the shape of a rectangular plate curved to form a partition wall or guide plate having parallel top and bottom horizontal edges and parallel vertical side edges. Both the top edge and bottom edge of each vane have formed therein a pair of vertically disposed cuts, forming at each cut two tongues, for a total of four tabs. This vane construction requires the provision in each plate or rail of a pair of longitudinally disposed channels or grooves having a V-shaped transverse cross-section. The grooves are formed by downwardly converging walls intersecting on fold line. Each groove or channel has formed therein a plurality of longitudinally spaced apart obliquely disposed slots to receive a pair of tongues, which must be peened over in opposite directions flush with the bottom walls of the V-shaped groove to retain a vane in position between the rails.

Gracer, U.S. Pat. No. 2,861,597, Nov. 25, 1958, Air Guide Device: Discloses single and double wall turning vanes secured in slots formed in the bottoms of dimples protruding inward from rails, by deforming lateral edge walls of the vanes protruding outwards through the slots.

Perlin, U.S. Pat. No. 2,884,956, May 5, 1959, Air Guide Device: Discloses flanged, slotted cup-shaped members inserted through holes formed in a pair of opposed side plates, to secure between the side plates turning blades positioned in the slots.

Gracer, U.S. Pat. No. 2,959,195, Nov. 8, 1960, Air Guide Device: Discloses an air turning assembly having a plurality of curved, rectangular plan view turning vanes or blades that are secured to a pair of rails by crimping opposite lateral edges of the blades protruding outwards through slots in inwardly extending protuberances formed in the rails.

Chesser, U.S. Pat. No. 3,050,160, Aug. 21, 1962, Sheet Metal Connection And Method For Effecting Same: Discloses a sheet metal connection employing a tongue protruding perpendicularly from a first plate inserted through a slot in a second plate, deformations being formed outwards from the plane of the tongue to lock it in place relative to the second plate.

Noll, U.S. Pat. No. 3,075,450, Jan. 29, 1963, Cap Assembly: Discloses a hollow tubular cap assembly having the shape of the frustrum of a cone, connectable to a cylindrical tube by extending flexible straps.

Bohannon, U.S. Pat. No. 3,144,204, Aug. 11, 1964, Centrifugal Blower Wheel: Discloses a centrifugal blower wheel having double-wall, air-foil shaped blades having a plurality of tabs protruding from opposite straight side walls thereof, the tabs on the two walls of each blade being inserted into first and second groups of slots provided through front and rear circular end plates, and bent over to retain the blades in place.

Olmsted, et al., U.S. Pat. No. 3,224,668, Dec. 21, 1965, Blower Wheel Wedged End Blade Mounting: Discloses curved blower wheel blades attachable to annular side rings by a central finger or tongue protruding from opposite short lateral edges of the blade. The fingers are bent into a V-shape, inserted into semi-circular or triangular-shaped holes through the side rings, and bent over to retain the blades in the rings.

Jacobsen, U.S. Pat. No. 3,381,713, May 7, 1968, Turning Vane And Rail Construction: Discloses double-wall, airfoil-shaped turning vanes having formed in the inner side of one wall a pair of cylindrically-shaped passageways disposed perpendicularly inwards from the outer lateral edge of the wall. Headed pins or nails are driven through holes provided in a pair of parallel side rails into the passageways, to secure the vanes to the rails.

Harper, U.S. Pat. No. 3,405,737, Oct. 15, 1968, Duct Device: Discloses double wall vanes secured in slots cut in inwardly protruding depressions in opposed side rails.

Hinden, U.S. Pat. No. 3,494,379, Feb. 10, 1970, Air Turning Assembly And Mounting Rail: Discloses an air turning assembly which employs turning vanes formed of glass fiber impregnated with a polymer and inserted through curved apertures or sockets punched in U-cross section rails. The sockets are outlined by outwardly deflected, spaced tabs or shoulder portions which are compressed by a cam lock against the protruding portion of a vane, thereby securing the vane to the rail.

Hinden, U.S. Pat. No. 3,602,262, Aug. 31, 1971, Air Turning Assembly: Discloses an air turning assembly utilizing fibrous, compressible vane members secured to a pair of parallel rails between the sides of a U-shaped clamp protruding inward from a rail and secured thereto.

Myers, U.S. Pat. No. 4,467,829, Aug. 28, 1984, Turning Vane Rail: Discloses a rail for mounting sheet metal turning vanes that includes a sheet and integral vane guides extending generally perpendicularly away from the plane of the sheet. Each vane guide is a plate slit from the sheet except for one edge along which the plate is bent. The plate is adapted to be positioned adjacent to a wall of the vane. An access aperture, partially located in the sheet and partially located in the plate is adapted to allow access to a portion of the vane wall for contact by a striking tool. A blow from the tool splits the sheet metal vane wall to form tabs which are folded through the aperture, which securely attaches the wall to the rail.

DeLord, U.S. Pat. No. 4,641,684, Feb. 10, 1987, Rail For An Air Turning Vane Assembly: Discloses an air turning vane assembly in which the vanes are attached to tabs formed in each rail by integral locking clips formed upon the rail tabs. The rail assembly is constructed from rails having cutout portions adapted to receive the tabs of similar rails, to permit compact nesting for storage and shipping. The assembly requires use of a special locking tool that has a cutting tooth which cuts a ribbon in a vane wall to form an integral locking clip for securing the vanes to rails.

Myers, U.S. Pat. No. 4,911,205, Mar. 27, 1990, Apparatus And Method For Duct Vane Mounting: Discloses a duct vane assembly having rails in which a pair of inwardly projecting, rectangular tabs lying in an arc are formed. Each tab is insertably secured in a laterally disposed slot formed near the outer lateral edge of each curved turning vane, the slot being defined by a lateral strap formed in the vane adjacent its end. A finger bent in the end of a rail tab projects into an opening in the vane adjacent the strap to positively retain the vane connected to the rails.

Felson, U.S. Pat. No. 5,068,957, Dec. 3, 1991, Turning Vane Setting Tool: Discloses a device and method for permanently anchoring air turning vanes to manufactured vane rails or runners in duct work systems that utilizes pre-positioning, splitting and bending means combined into one continuous sequence when the tool is applied to the exposed edge of an air turning vane which has been inserted into the slotted depression of manufactured vane rails or runners and is activated by means of a hammer blow or similar energy source.

Lyons, et al., U.S. Pat. No. 5,181,314, Jan. 26, 1993, Apparatus For Manufacturing Air Turning Assembly: Discloses an apparatus and method for forming air turning assemblies. The vanes are conventional bowed rectangular sheets, the lateral edges of which are secured in slotted projections on the inner surface of each rail by chisel lips entering the slots in projections and bending over the edges of the vane protruding therethrough.

The Gracer, Felson and Lyons, et al. patents all disclose a turning vane and rail construction which requires the formation of slotted depressions in the rails to secure the vanes thereto. The Hinden '379 patent discloses a turning vane assembly which uses tabs projecting outward from the perimeter of an aperture through a flat rail which are compressed by a locking cam against the perimeter of a compressible vane protruding through the aperture. The Hinden '262 patent discloses the use of a U-shaped compression bracket protruding inwards from a rail and attached thereto by a pop rivet to compress the end of a resilient vane, to which it is secured by another pop rivet. DeLord discloses a rail for a turning vane assembly that utilizes tabs bent inwards from apertures in the rail to attach to an integral locking clip formed in the end wall of a vane by a special tool. Myers discloses a vane and rail construction which utilizes a strap formed near each end of a vane by a laterally disposed slot, the slot insertably receiving a tab bent out from an aperture formed in a rail and secured to the vane by a finger bent out from the end of the tab.

Vane and rail assemblies known to the present inventors, including those cited above, generally require that portions of sheet metal vanes or rails which are to be joined together be deformed by robustly pounding parts thereof, using either a hammer, chisel, or specially designed tools, to fasten the vanes and rails together. Sometimes, pounding on a vane and rail assembly to install a series of vanes can loosen the fastening of vanes installed earlier. Then, when a completed vane and rail assembly has been installed into a duct work elbow; and the latter installed in a building, variations in the pressure of air flowing through the duct work can cause the "cheeks" or walls of curved transition sections to expand and contract, and perpendicular duct walls to flex inward and outward or "oil-can" in response to air pressure fluctuations. Since environmental control systems for buildings require that air flow be turned on and off intermittently, or varied by control dampers, duct work air turning vane assemblies are routinely subjected to such wall deformations. As a result, vanes which had been initially loosened during the fabrication of a turning vane and rail assembly can become completely detached from the rails long after duct work has been installed in a building. As can be readily appreciated, replacing dislodged turning vanes can be an extremely time consuming, laborious and expensive process, particularly in high-rise buildings.

Partly in response to limitations of prior art air turning vane and rail assemblies, the present inventors developed improved air turning vane and rail assemblies of simplified construction and greater versatility than existing assemblies, in which vanes self-lock into engagement with rails, thereby minimizing the likelihood of vanes dislodging from a vane and rail assembly. Those improved turning vane and rail assemblies are disclosed in the present inventors' co-pending application Ser. No. 08/912,385, filed Aug. 18, 1997. The disclosure of this application is hereby incorporated by reference into the present disclosure.

An embodiment of an air turning vane and rail assembly according to the co-pending disclosure includes a pair of laterally spaced apart parallel rails. Each of the rails has a plurality of longitudinally spaced apart, generally trapezoidally-shaped tabs, each bent perpendicularly inwardly towards the opposite rail from a separate perforation through the rail. Each of the upstanding tabs has through its thickness an aperture located near the base of the tab. A plurality of self-gripping double air-foil vanes lockingly engage the tabs, each vane having a generally hemispherically shaped protuberance which protrudes forward through the aperture from a rear concave air-foil plate towards a front convex airfoil plate. In this embodiment the protuberance has an inner flat, transversely disposed lip which locks against the upper wall of the aperture through the tab, when the tab is forcibly inserted into the opening between the front and rear airfoil plates of a vane.

The present invention was conceived of to provide a novel and advantageous method and apparatus for forming self-locking protuberances in air turning vanes of the type described above.

OBJECTS OF THE INVENTION

An object of the present invention is to provide a method for forming a locking button in a double airfoil air turning vane, the locking button being adapted to lockingly engage the edge wall of an aperture provided through a tab upstanding from an air turning rail.

Another object of the invention is to provide a method for forming in an airfoil plate of an air turning vane a generally hemispherically-shaped protuberance which may be used to lockingly engage an air turning rail.

Another object of the invention is to provide a method for forming in an airfoil plate of a double-airfoil air turning vane a locking button which protrudes inwards towards the other airfoil plate.

Another object of the invention is to provide a method for severing from a length of double airfoil plate air turning vane stock an air turning vane of a desired length, while simultaneously forming in one of said airfoil plates a generally hemispherically-shaped protuberance which may serve as a locking button for subsequent attachment of the air turning vane to a rail.

Another object of the invention is to provide a method for severing from a length of double airfoil plate air turning vane stock an air turning vane of a desired length, while simultaneously forming in an airfoil plate near the transverse severed edge of the vane and near the transverse severed edge of the vane stock separate locking buttons which protrude forward towards the other airfoil plate.

Another object of the invention is to provide an apparatus for receiving a length of double airfoil vane stock, severing from the vane stock a double plate air turning vane of a desired length, and forming in a first airfoil plate of the severed air turning vane a button-like locking protuberance located proximate the severed edge of the turning vane.

Another object of the invention is to provide an apparatus for receiving a length of double airfoil plate air turning vane stock, severing from the vane stock a double airfoil plate air turning vane of a desired length and forming in a first airfoil plate portion of both the severed air turning vane and the air turning vane stock a button-like locking protuberance located inwards from the respective severed edges of the air turning vane and the stock from which it was severed.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, we do not intend that the scope of our exclusive rights and privileges in the invention be limited to details of the embodiments described. We do intend that equivalents, adaptations and modifications of the invention reasonably inferable from the description contained herein be included within the scope of the invention as defined by the appended claims.

SUMMARY OF THE INVENTION

The present inventors' application Ser. No. 08/912,385 now U.S. Pat. No. 5,927,339 issued Jul. 27, 1999, discloses improved air turning vane and rail assemblies for promoting laminar air flow at locations within heating, ventilating or air conditioning ("HVAC") duct work where the air flow direction must change, as for example, within an elbow bent at 90 degrees or other angle. The present invention comprehends an apparatus and methods for making self-gripping air turning vanes of the type disclosed in the 339 patent.

According to the disclosure of present inventors' b 339patent, an improved turning vane and rail assembly for promoting laminar air flow was described, in which vanes may be fastened to rails without requiring the use of tools. Thus, vane and rail air turning assemblies according to the 339 patent may be readily assembled at job sites from compact packages of rails and vanes.

Preferred embodiments of an improved air turning vane and rail assembly according to applicants' prior invention disclosed in the "339" patent utilize double-plate, airfoil-type turning vanes. According to the disclosure of prior disclosed invention, the turning vane has an arcuately curved, convex front airfoil plate joined at opposite longitudinal edge walls thereof to a concave rear airfoil plate having less curvature, i.e., a larger radius of curvature than the front plate.

Air turning vanes thus described are attached to a pair of flat elongated rectangular sheet metal rails, perpendicularly disposed between the rails, in a novel construction in which each of the two rails of an air turning assembly comprises an elongated rectangular strip of sheet metal in which a plurality of generally polygonally-shaped perforations have been made at regular longitudinal intervals along the strip. Each perforation has a modified trapezoidal shape, defined by a laterally symmetric, wedge-shaped trapezoidal upper portion, and a laterally elongated, rectangular portion pedestal. The base of the rectangular lower portion of the perforation is left uncut, and serves as a self-hinge or fold line on which a generally trapezoidally-shaped tab is bent perpendicularly outwards from the plane of the strip.

According to the prior invention, each trapezoidal rail tab has a pair of relatively long, laterally opposed outwardly and downwardly sloping edge walls, each joined at the lower end thereof to a short, vertically disposed edge wall of a rectangular pedestal. The lateral spacing between the upper portion of the sloping edge walls of each tab is less than the lateral spacing between the inner facing surfaces of the front and rear airfoil plates, allowing the upper end of the tab to be insertably received in the opening between the front and rear airfoil plates. However, the widths of lower portions of the trapezoid and the pedestal are greater than the lateral spacing between inner walls of the front and rear airfoil plates. Thus, when a turning vane is pushed downwards sufficiently far over an insertably received rail tab, both front and rear airfoil plates are deformed laterally outwards to a flatter contour having a smaller curvature. Wedging action of a rail tab inserted into the space between the front and rear airfoil plates is facilitated by the sloping, wedge-shaped side walls of the rail tab.

According to the prior invention, both front and rear plates are made of a thin, flexible but reasonably stiff material such as sheet steel, which possesses a substantial degree of elasticity when bowed. This elasticity produces a negative hoop tension on both plates, i.e., a force directed radially inwards towards the center of curvature of the plates, which causes both plates to attempt to assume the larger curvatures which they had prior to being deformed by the wedging action of a rail tab. These hoop tension forces cause those portions of the front inner airfoil plate surfaces in contact with the tab side walls to exert a radially inwardly directed gripping force on the tab side walls. The hoop tension forces on the tab side walls also have rearwardly directed force components which force the rear face of tab into abutting contact with the front convex face of the rear airfoil plate. These forces combine to tightly grip the tab, thereby securing the vane to the tab.

In a particular embodiment of the prior invention, the air turning vane included a bowed front airfoil plate having a convex front surface and a bowed rear airfoil plate having a concave rear surface. The rear plate has formed therein a pair of longitudinally spaced apart, generally hemispherically shaped locking buttons which protrude forward from the front or inner convex surface of the rear plate. The two locking buttons are located longitudinally inwards from the upper and lower transverse edge walls of the rear airfoil plate, respectively. Also, the locking buttons are located on the longitudinal center line of the rear airfoil plate, and protrude forwards towards the longitudinal center line of the front airfoil plate.

In embodiments of the invention employing locking buttons, a small rectangular aperture is provided through the thickness dimension of each trapezoidally-shaped tab, above the fold line, for receiving a locking button of a vane. These button-receiving apertures are most conveniently formed in rail sheet stock prior to bending up the tab.

While a vane provided with buttons is being pushed down on a tab inserted between the front and rear vane plates, the lower button protruding inwards from the rear airfoil plate is forced against a vertical wall surface of the rail tab. When the button encounters the aperture formed through the tab near its base, the hoop spring tension in the front and rear airfoil plates, which tends to restore both plates to the initial greater curvature possessed before being wedged laterally outwards by the rail tab, causes the lower button to snap into the aperture in the rail tab. Engagement of an upper transversely disposed lip on the button with the rail tab perforation edge wall securely locks the lower end of the vane to the lower rail.

After a vane has been thus installed on each upstanding tab of a lower rail, an identical upper rail, turned upside down so that its tabs protrude downwards, may be attached to the upper ends of each upstanding vane by aligning the tabs downwardly protruding from the upper rail with corresponding upper openings in the vanes, and pushing downwards on the upper rail to wedgingly engage each vane by an upper tab. Engagement of a lower flat, transversely disposed lip on the upper vane button with the rail tab perforation edge wall securely locks the upper end of the vane to the upper rail. Notably, vane and rail assemblies according to the prior invention, as described above, may be assembled on a job site from pre-manufactured vanes and rails by hand pressure alone, without requiring any tools.

According to the present invention, a method and apparatus for forming locking buttons in vanes of the type described above includes cutting an elongated length of double airfoil vane stock into air turning vanes of a selected length, while simultaneously forming a locking button longitudinally inward from each of the two opposed severed transverse edges of the vane stock. The apparatus according to the present invention includes a guillotine-like shearing structure including front and rear parallel and longitudinally spaced apart blade support plates which vertically slidably support a guillotine blade therebetween. Each blade support plate has through its thickness dimension a crescent-shaped or smile-shaped aperture, having a lower concave wall surface adapted to slidingly receive the front or lower convex surface of a length of double airfoil air turning vane stock inserted through the aperture. Each aperture also has an upper, downwardly convex wall surface adapted to slidingly receive the upper or rear concave surface of the length of air turning vane stock inserted through the apertures. The upper edge wall of each blade support plate has formed therein a centrally located rectangular punch access slot which extends downwardly and penetrates the upper convex aperture wall.

The shear blade of the apparatus according to the present invention includes a plate of generally uniform thickness. The plate in front plan view has a laterally elongated, rectangularly-shaped upper portion, and a downwardly depending triangularly-shaped portion. The latter is symmetrically located with respect to a longitudinal medial plane of the blade, with the apex of the triangle lying on the longitudinal center line of the blade and forming a piercing wedge for severing both front and rear plates of vane stock insertably received through the blade support apertures.

According to the present invention, both the front and rear surface of the upper rectangular portion of the blade have protruding outwards therefrom a separate lancing punch adapted to form generally hemispherically-shaped button-like protuberances in the upper, concave rear edge walls of both sides of a length of vane stock sheared apart by downward motion of the shear blade. Each lancing punch has in front plan view a radiused, downwardly protruding wedge-shaped point symmetrically located on the longitudinal center line of the shear blade. In side elevation view, the downwardly depending point of the lancing punch has a flat outer surface, and a front face which slopes upwardly and inwardly from the outer face to the base of the lancing punch, which is in flat contact with the shear blade face. The front or lower face of the lancing punch is arcuately curved, conformally with the outer point face of the lancing punch.

According to the method of the present invention, the shear blade is elevated to a position above the apertures through the blade slide support plates, and a length of double airfoil vane stock inserted through the rear smile-shaped blade support aperture and extended through the front smile-shaped aperture to a distance from the front surface of the blade equal to the desired length of an air turning vane. The shear blade is then forced sharply downwards, by means of a pneumatic or hydraulic actuator cylinder, for example. As the blade travels downwards, the triangular-shaped piercing point of the blade pierces and severs the forward protruding length of the stock from the rear portion of the stock. Near the downward limit of the shear blade travel, the two lancing punches on the front and rear sides, respectively, of the shear blade, forcibly contact the severed front and rear lengths of the upper concave plate of the vane stock, a short distance forward and rearward, respectively, of the two severed edges. The forcible contact of each lancing punch forms a small transversely disposed slit in the concavely curved rear or upper airfoil plate of the vane stock, and also forms a generally hemispherically-shaped button-like protuberance between the slit and the transverse severed edge of the vane stock. The protuberance, which serves as a locking button as described above, protrudes downwards toward the convexly curved front or lower airfoil plate of the vanes.

BRIEF DESCRIPTION OF THE DRAWINGS

FIG. 2 is an upper plan view of an air turning vane and rail assembly similar to that shown in FIG. 1, but with the upper rail thereof removed to show orientations of vanes relative to air flow direction.

FIG. 10 is a fragmentary front elevation view of the apparatus of FIG. 8, on a somewhat enlarged scale.

FIG. 11 is a side elevation view of the structure of FIG. 9.

FIG. 14 is a front elevation view of the shear blade of the apparatus of FIG. 10.

FIG. 15 is a side elevation view of the shear blade of FIG. 14.

FIG. 16 is a front elevation view of a punch appendage of the shear blade of FIG. 14.

DESCRIPTION OF THE PREFERRED EMBODIMENTS

Figure 1:
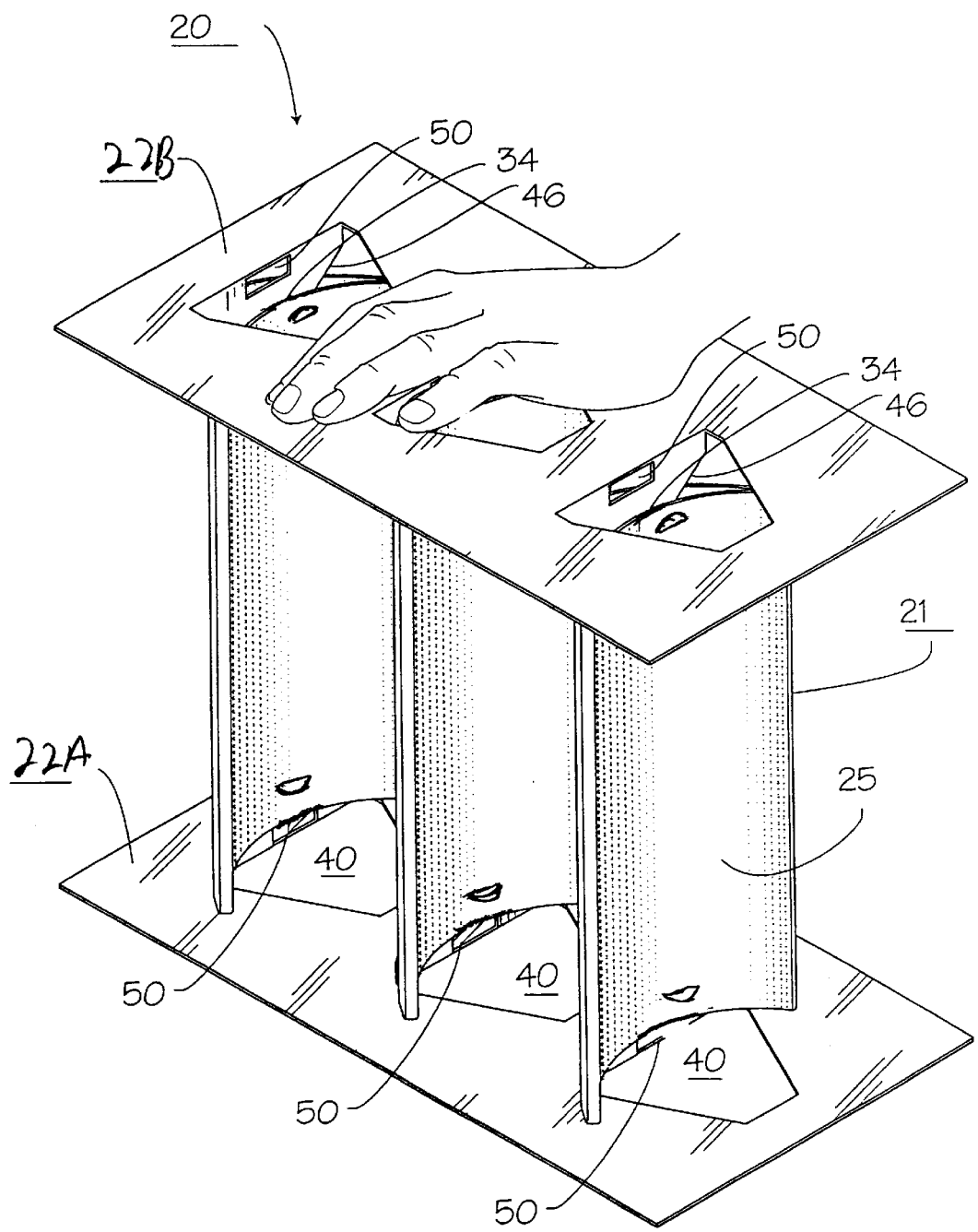
FIG. 1 is a perspective view of a partly completed air turning vane and rail assembly employing air turning vanes made by the method and apparatus of the present invention.
Figure 7:
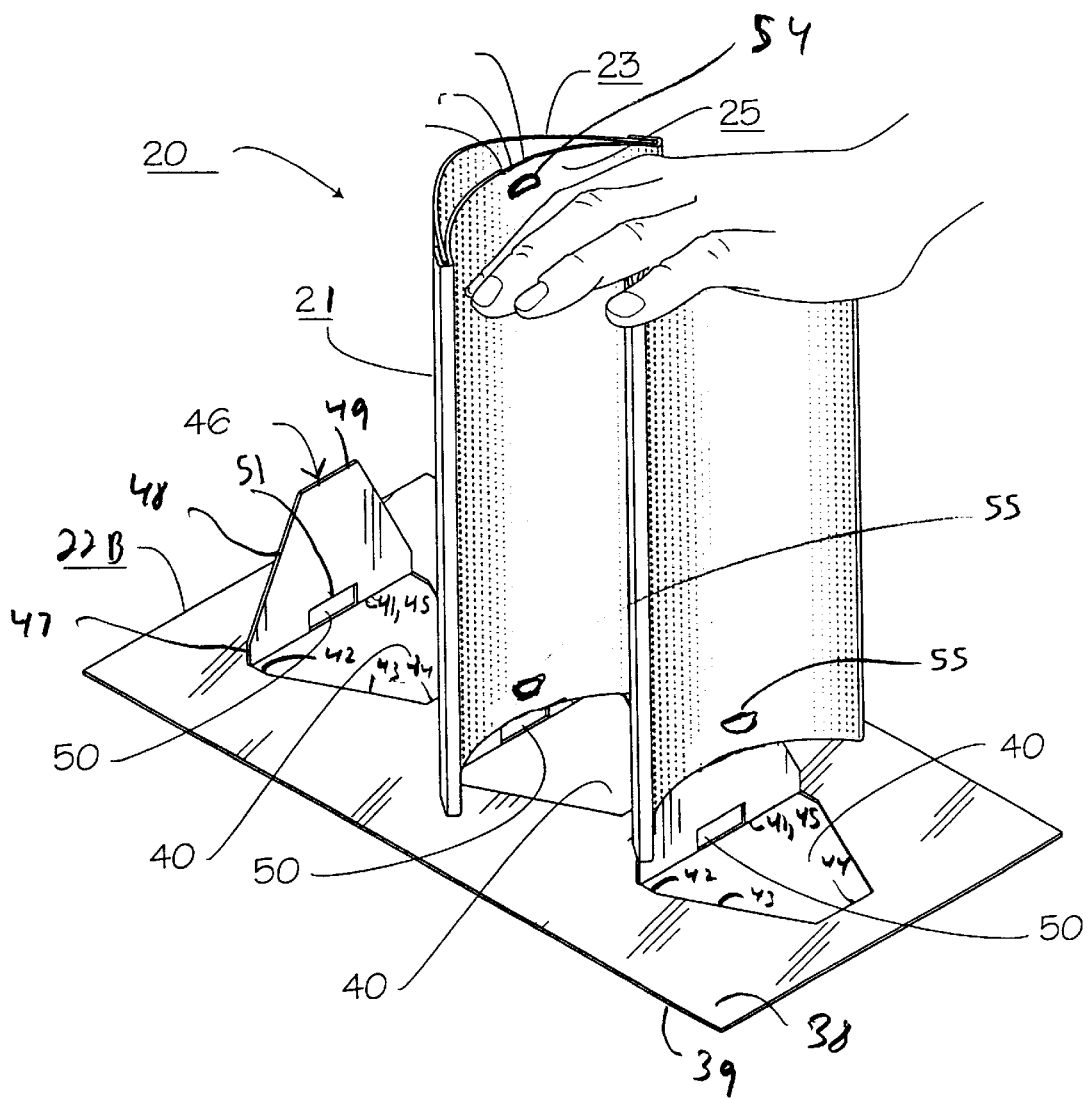
FIG. 7 is a perspective view showing the manner of attaching vanes to a first lower rail of the vane and rail assembly of FIG. 1.

FIGS. 1, 2, and 7 illustrate an air turning vane and rail assembly employing self-gripping air turning vanes made by the method and apparatus of the present invention. FIGS. 3–6 are views of a self-gripping air turning vane of the type used in the assembly of FIGS. 1, 2 and 7. FIGS. 8–17 illustrate a method and apparatus for making self-gripping air turning vanes according to the present invention.

FIGS. 1–7 depict an air turning vane and rail assembly utilizing self-gripping vanes according to the invention disclosed in applicants' co-pending application Ser. No. 08/912,385. As shown in FIGS. 1 and 2, air turning vane and rail assembly 20 includes a plurality of thin, double walled arcuately curved air turning vanes 21 perpendicularly disposed at regular longitudinal intervals between a pair of generally flat, longitudinally elongated rectangular lower and upper rails 22A, 22B.

FIG. 2 shows a partly assembled vane and rail assembly 20 installed in a right-angle duct work elbow A. Air flow directions in the elbow are indicated by arrows B.

Figure 3:
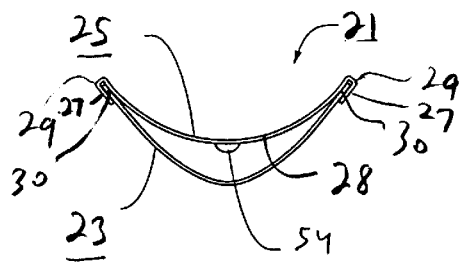
FIG. 3 is an upper plan view of a self-gripping air turning vane of the type used in the assembly of FIG. 1.
Figure 4:
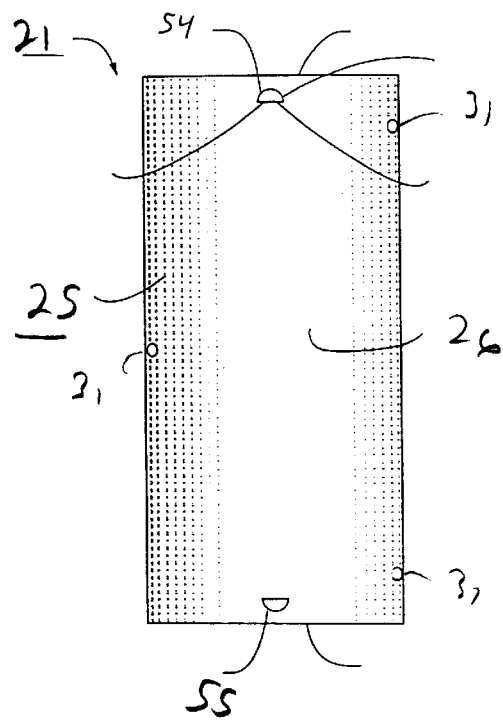
FIG. 4 is a rear elevation view of the air turning vane of FIG. 3.
Figure 5B:
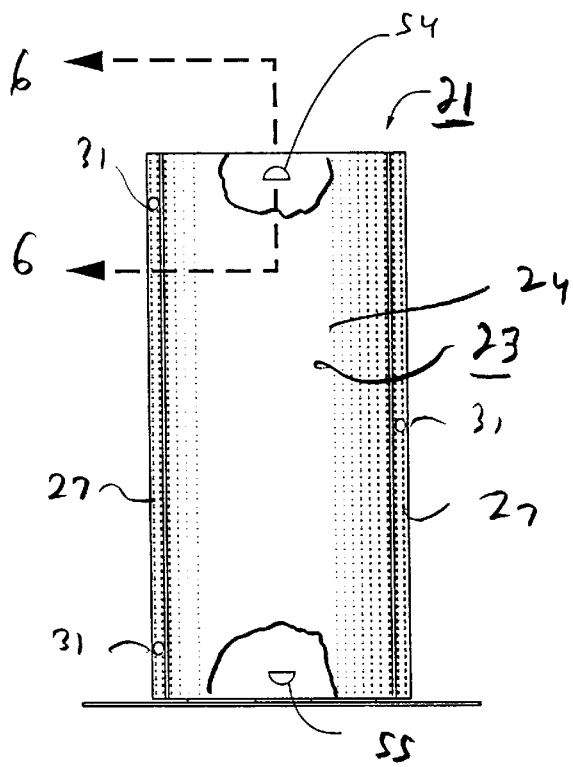
FIG. 5 is a partly broken-away front elevation view of the air turning vane of FIG. 3.
Figure 6:
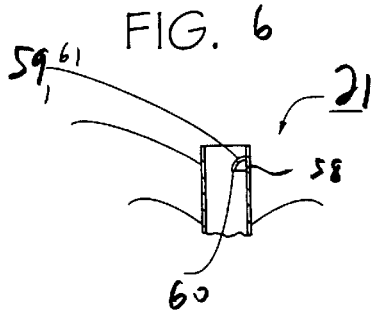
FIG. 6 is a transverse sectional view of the turning vane of FIG. 5, taken along line 6—6.

Referring to FIGS. 4 and 5, in addition to FIG. 3, each turning vane 21 may be seen to include a front, vertically elongated rectangular plate 23. Plate 23 is bowed around a vertical center line into a curved shell having a uniform, arcuately curved transverse cross section which has a front convex surface 24. Front plate 23 is joined at the longitudinal edges thereof to a rear, rectangular plate 25 bowed similarly to front plate 23, and having a rear concavely curved surface 26.

As will be described below, front and rear vane plates 23 and 25 are fabricated from sheet stock having a certain degree of elasticity, such as 22-gauge to 24-gauge galvanized G90 sheet steel.

As shown in FIGS. 3, 4 and 5, rear plate 25 of turning vane 21 has a generally rectangular shape with thin longitudinal margins 27 that are folded or rolled over towards the front convex surface 28 of the rear plate, forming radiused longitudinal edge walls 29. Front plate section 23 of vane 21 has a plan view shape similar to that of rear plate section 25. However, front plate section 23 has a curved width or maximum chord length slightly less than the curved width or chord length of rear plate section 25. Longitudinal margins 30 of front plate 23 are sandwiched between the inner surface of folded-over margin 27 of rear plate 25, and front convex surface 24 of the front plate, thereby fastening the front and rear plates together. Preferably, as shown in FIGS. 4 and 5, front plate 23 and rear plate 25 are further secured to one another by one or more dimples 31 punch-formed in the front surfaces of margins 27 of the rear plate, the dimples protruding into margins 30 of the front plate and into the rear and front surfaces of the rear plate.

As has been described above, turning vane 21 consists of a front plate 23 having a convexly curved front or outer surface 24, and a rear plate 25 spaced rearward from the front plate and having a rear or inner concave surface 26 of less curvature than front convex surface 24. Thus, the double wall or double-plate construction of vane 21 has the shape of an airfoil, in which air flow velocity over longer, convex front surface 24 is greater than the flow velocity over shorter, rear concave surface 26. This construction facilitates laminar air flow within duct A. Moreover, the double-plate, airfoil-type construction provides greater structural rigidity to vane and rail assemblies than single-plate vanes.

As shown in FIG. 1, air turning vanes 21 according to the present invention are fastened at the upper and lower transverse edges thereof to a pair of parallel, elongated flat upper and lower sheet metal rails 22. The construction of rails 22 which permits vanes 21 to be fastened to rails 22 without use of tools may be best understood with reference to FIGS. 1 and 7.

Referring now to FIGS. 1 and 7, rail 22 may be seen to have an elongated rectangular plan view outline defined by flat and parallel upper and lower walls 38 and 39. As may be seen best by referring to FIG. 1, rail 22 has formed through the thickness dimension thereof a plurality of generally trapezoidally-shaped perforations 40. Each rail perforation 40 has the shape of a regular trapezoid, symmetrically disposed about the longitudinal center line of the rail and resting conformally on a short, laterally elongated, rectangularly-shaped pedestal. Thus, each rail perforation 40 includes a transversely disposed base 41, laterally opposed straight pedestal sides 42 depending perpendicularly upwards from the base, a pair of laterally opposed straight, obliquely inwardly and upwardly angled oblique walls 43, and an upper edge wall 44 parallel to base 41. As shown in FIG. 7, base 41 of perforation 40 is not severed, leaving an uncut fold line 45, on which a generally trapezoidal-shaped tab 46 may be folded outward from the plane of rail 22. Thus, as shown in FIG. 1, tab 46 is folded upwards out of perforation 40 at a 90-degree angle to the plane of rail 22, into a vertically upwardly disposed position.

As shown in FIG. 7, trapezoidally-shaped tab 46 has a base 45, perpendicular pedestal side walls 47, oblique upper walls 48, and top wall 49 parallel to base 45.

As shown in FIGS. 1 and 7, tab 46 has formed through its thickness dimension a small, centrally located, laterally elongated rectangular perforation 50 having a lower edge wall coextensive with base 45 of the tab.

FIGS. 3–6 illustrate a self-gripping air turning vane according to the present invention.

As shown in FIGS. 3–6, air turning vane 21 includes a bowed front plate 23 having a convex front surface 24, and a bowed rear plate 25 having a concave rear surface 26. Rear plate 25 has formed therein a pair of longitudinally spaced apart, generally hemispherically-shaped, button-like protuberances 54 and 55 which protrude forward from front convex surface 28 of the rear plate. "Buttons" 54 and 55 are located longitudinally inwards from the upper and lower transverse edge walls 56 and 57, respectively, of rear plate 25.

As may be seen best by referring to FIG. 4, each button 54 and 55 may be fabricated by forming in the rear concave surface 26 of rear plate 25 a depression or indentation 58 having an arcuately curved convex outer edge 59, proximate an outer transverse edge wall 56 or 57 of the rear plate, and a straight, transversely disposed inner chordal edge or lip 60.

As may be seen best by referring to FIG. 5 in addition to FIG. 4, inner chordal edge 60 of indentation 58 preferably pierces rear plate 25. In any event, as shown in FIGS. 3, 4 and 5, buttons 54 and 55 each protrude forward from front convex surface 28 of rear plate 25 and have a longitudinally outwardly disposed, convex, generally hemispherically-shaped surface 61, and an inner transversely disposed lip 60. Thus constructed, when vane 21 is forced downwards on a tab 46, the outer hemispherically-shaped surface 61 of a button 54 or 55 slides along the surface of the tab until lip 60 of the button encounters aperture 50 through tab 46. At this position, button 54 or 55 springs forward into tab aperture 50, and lip 60 locks securely against upper edge wall 51 of tab perforation 50. To further secure engagement of tab edge wall 55 by button lip 60, the button lip may be angled towards an adjacent lateral edge of rear vane plate 25, at an angle of about 82 degrees to 85 degrees to rear surface 26 of the rear vane plate, rather than the 90-degree angle depicted in FIG. 6.

Referring now to FIG. 7, the novel method of assembling a turning vane and rail assembly 20 utilizing vanes 21 and rails 22, constructed as described above, will now be described.

As shown in FIG. 7, according to the present invention, a plurality of vanes 21 are first fastened to a first, lower rail 22A forming a partially completed vane and rail assembly 20, as shown in FIG. 7. Then, as shown in FIG. 1, a second, upper rail 22B is fastened in a similar way to the upper ends of a plurality of vanes 21 previously fastened to lower rail 22A.

Referring now to FIG. 7, a vane 21 is shown positioned above a tab 46 which protrudes upwards from the plane of rail 22A, with the vane pushed downwards sufficiently far for the sloping upper walls 48 of the tab to wedgingly contact the inner or rear concave surface 26 of front airfoil plate 23. Then, as shown in FIG. 7, the palm of a person's hand may be used to force vane 21 further downwards, while the other hand may be used to maintain the vane perpendicular to rail 22A, if desired.

As sloping walls 48 of tab 46 wedge against concave inner surface 26 of front vane plate 23, the chordal line defining the contact points between the sloping tab walls and the inner surface of the vane plate lengthens, thereby deforming the front plate to have a flatter, less curved contour. Since longitudinal margins 37 of rear plate 25 are crimped tightly onto margins 30 of front plate 23, deformation of the front plate margins outwards in response to the wedging action of sloping side walls 48 of tab 46 causes the margins of the rear plate to also deform outwardly.

Deformation of rear plate 25 to a flatter contour also occurs because of the rearward force exerted on the front edge wall of button 55 by the rear face 52 of tab 46 when it is slid downwards in contact with rear face of the tab.

When a vane 21 is forced downwards on tab 46 sufficiently far for the lower transverse edge of the vane to contact the upper surface 38 of rail 22B, button 55 is located adjacent rectangular perforation 50 through the base of tab 46. At this position, negative hoop tension on front airfoil plate 23 and rear airfoil plate 25 resulting from the elasticity of the sheet steel stock from which they are both made, causes both plates to bend in an attempt to assume the larger curvatures they possessed prior to being deformed by the wedging action of tab 46. Thus, button 55 springs forward into tab aperture 50 immediately upon encountering the aperture. In this position, lip 60 of button 55 lodges securely against upper edge wall 51 of tab perforation 50, securely locking vane 21 to rail 22A. This elasticity also causes the vertical side walls 47 of tab 46 to be firmly gripped by the contacting inner, rear concave surface 32 of front airfoil plate 23. Moreover, the gripping action forces the rear surface of tab 46 against front convex surface 28 of rear airfoil plate 25. Thus, vane 21 is securely fastened to rail 22A by this novel construction, both by gripping and locking actions.

After a first vane 21 has been fastened to a lower rail 22A in the manner described above and shown in FIG. 7, additional vanes may be individually fastened to the lower rail, as shown in FIG. 7.

Fastening of vanes 21 to each of the upstanding tabs 46 of a lower rail 22B results in the sub-assembly shown in FIG. 7. An upper rail 22B is then attached to the upper ends of the vanes, in the manner illustrated in FIG. 1, and described in more detail below.

Referring now to FIG. 1, a second, upper rail 22B is shown in an inverted position overlying the vane and rail sub-assembly of FIG. 1, that sub-assembly comprising a lower rail 22B having a vane 21 lockingly fastened to each tab 46 protruding upwards from the lower rail. A tab 46 protruding downwards from an end of upper rail 22B is inserted into the opening between front and rear plates 23 and 25 of an upstanding vane 21 at a corresponding end of lower rail 22B. Pressure is then applied to that portion of the lower surface of upper rail 22B overlying the end vane 21, forcing downwardly protruding tab 46 into locking engagement with the upper end of the end vane.

After a first, end tab 46 of upper rail 22B has been fastened to the upper end of the end vane 21 of vane and rail sub-assembly 20 as described above, each successive tab 46 protruding downwards from the upper rail is lockingly engaged with a button 54 protruding laterally outwards from the upper end of each successive vane, by mere application of pressure as described above. Fastening of the upper end of each vane 21 to upper rail 22B in the manner described above results in a completed vane and rail assembly 20 as shown in FIG. 1.

Referring now to FIGS. 8–16, methods and apparatus for fabricating self-gripping air turning vanes 21 of the type shown in FIGS. 1–7 and described above will now be described.

FIGS. 8–16 show an apparatus 70 according to the present invention for receiving a length of air turning vane stock C, shearing from the vane stock an air turning vane 21 of a desired length, and forming inward from each vane's severed edge and the severed stock edge locking buttons 54 and 55 of the type shown in FIGS. 3 through 6 and described above.

Figure 8:
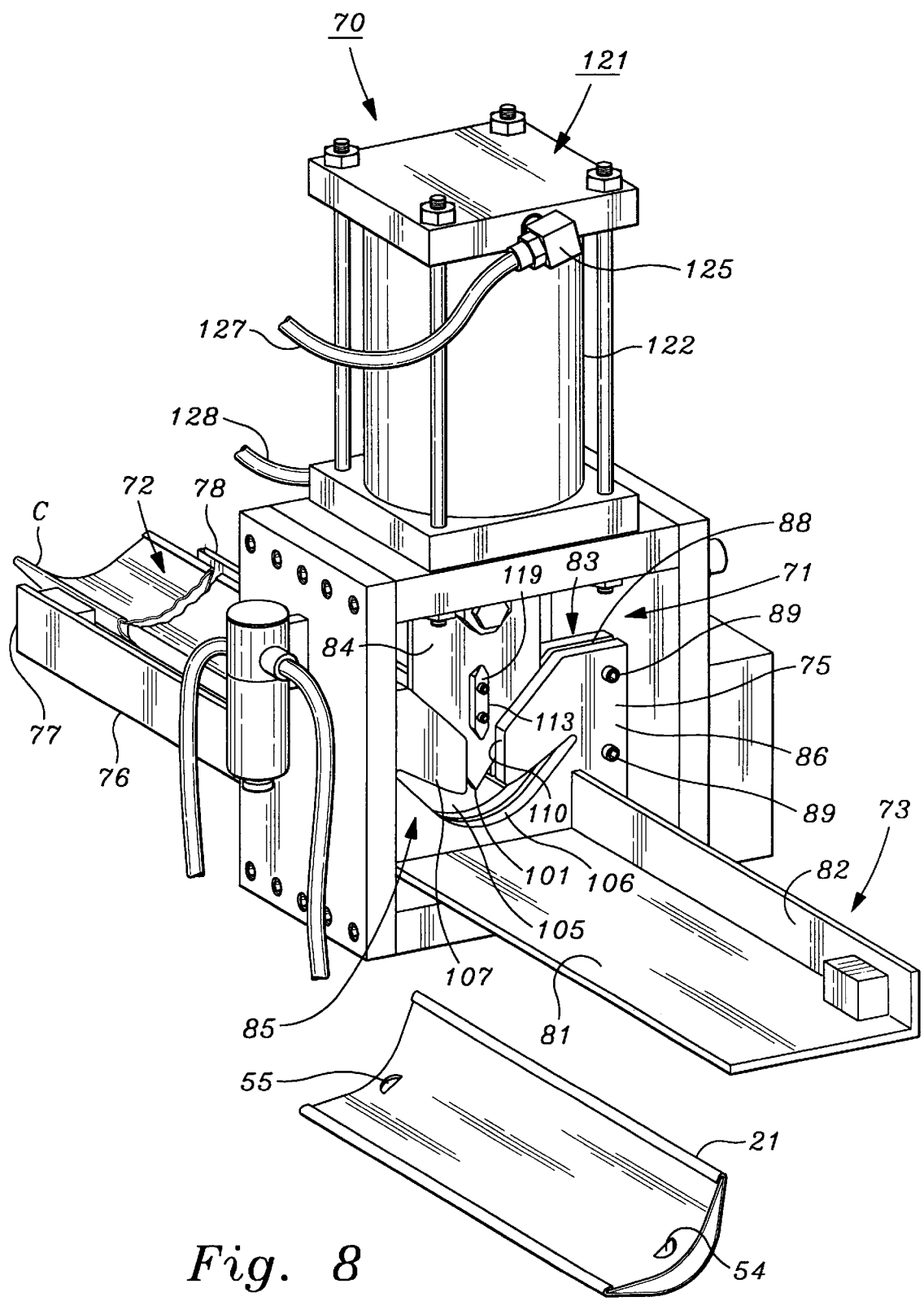
FIG. 8 is a front perspective view of an apparatus for shearing vane stock and forming locking buttons therein according to the present invention.
Figure 9:
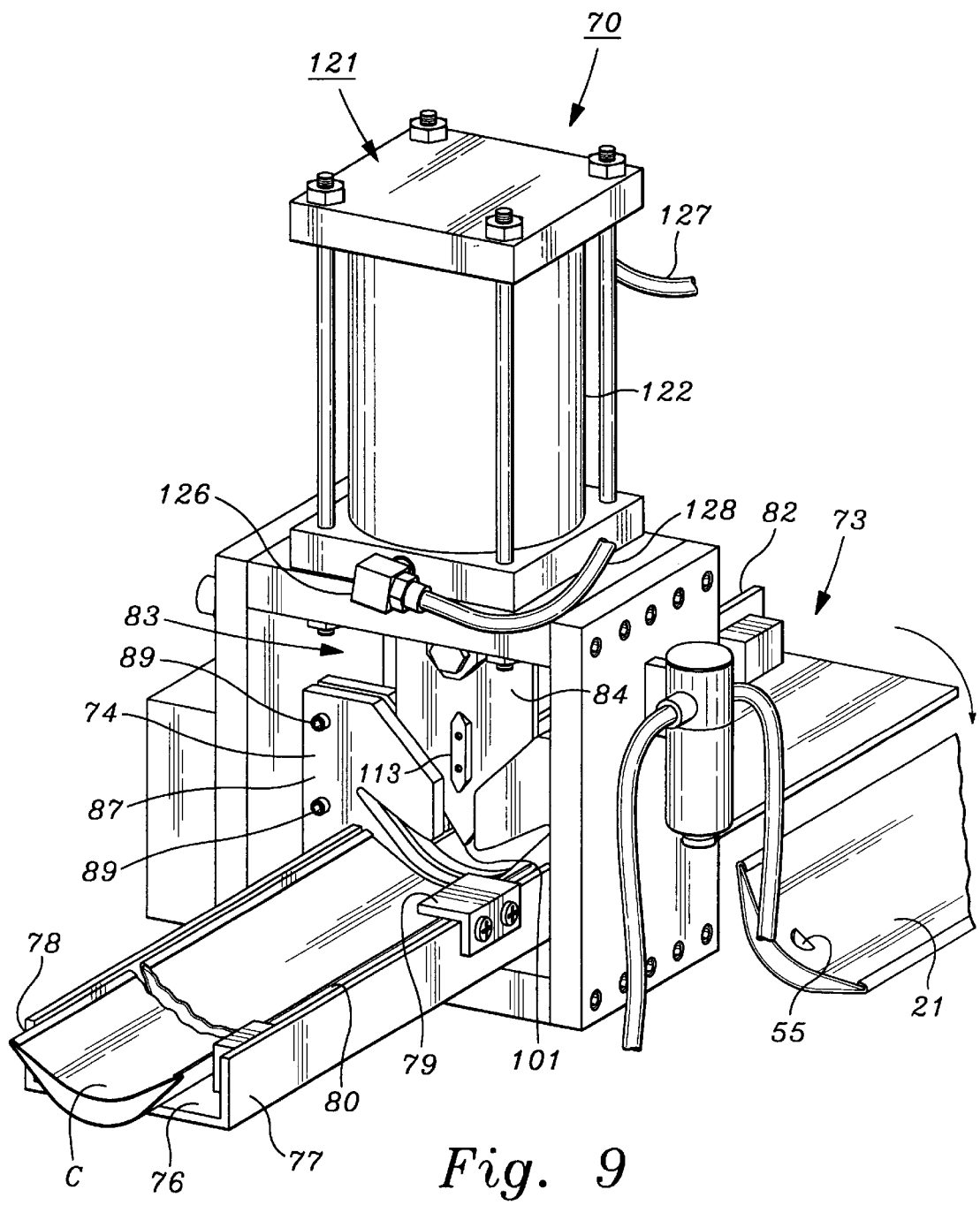
FIG. 9 is a rear perspective view of the apparatus of FIG. 8.

As shown in FIGS. 8–10, vane shearing and locking button-forming apparatus 70 includes a guillotine-like shearing/button forming mechanism 71, a rear, input feed channel 72 in which elongated lengths of vane stock C may be advanced forward into the shearing/forming mechanism, and a front, output vane channel for receiving vanes 21 severed from the vane stock by the shearing/forming mechanism. According to the present invention, a locking button 54 is formed inwardly of the rear severed edge of a vane 21 which has been cut to a desired length by shearing/forming mechanism 71. Preferably, apparatus 70 includes in shearing/forming mechanism 71 means for forming a locking button 55 inwardly of the front severed edge of vane stock C, as well as a button 54 inwardly of rear severed edge of a vane 21. Thus constructed, each vane 21 processed by shearing/forming mechanism 71 has formed therein a front locking button 55 and a rear locking button 54, inwardly of the front and rear transverse edges, respectively, of the vane.

As shown in FIGS. 8–11, input feed channel 72 and output channel 73 are longitudinally aligned and abut the rear and front side walls 74 and 75 of shearing/forming mechanism 71, respectively. As is also shown in FIGS. 8–11, input and output channels 72 and 73 are disposed perpendicularly to rear and front side walls 74 and 75 of shearing/forming mechanism 71. Moreover, channels 72 and 73 preferably are oriented in a horizontal disposition, enabling vane stock and severed vanes to be supported in the channels under the force of gravity. To this end, rear, feed stock inlet channel 72 has a C-shaped transverse section, including a bottom wall 76, and left and right side walls 77 and 78. To keep vane stock C in a horizontal disposition within inlet channel 72, a horizontally disposed retainer flange 79 is provided over an upper edge wall 80 of either left or right side walls 77 and 78 of the channel. As shown in FIG. 9, retainer flange 79 preferably extends only part way over opening 81 of channel 72, to allow ready access to vane stock C within the channel.

Referring now to FIGS. 10 and 11, it may be seen that front, output channel 73 has a bottom wall 81 lying in the same plane as bottom wall 76 of rear, inlet feed channel 72, and horizontally aligned therewith. Front, output channel 73 also has an inner side wall 82 co-extensive with inner, or right-hand side wall 78 of feed channel 72. Preferably, front, turning vane outlet channel 73 has an L-shaped section, having no outer side wall analogous to outer or left side wall 77 of inlet channel 72. Thus constructed, turning vanes 21 severed from vane stock C and protruding forward from shearing/forming mechanism 71 may conveniently be rolled outwards from outlet channel 73 to drop into a collecting receptacle.

The novel structure and function of shearing/forming mechanism 71 may be best understood by referring to FIGS. 12–16, in addition to FIGS. 9–11.

Figure 12:
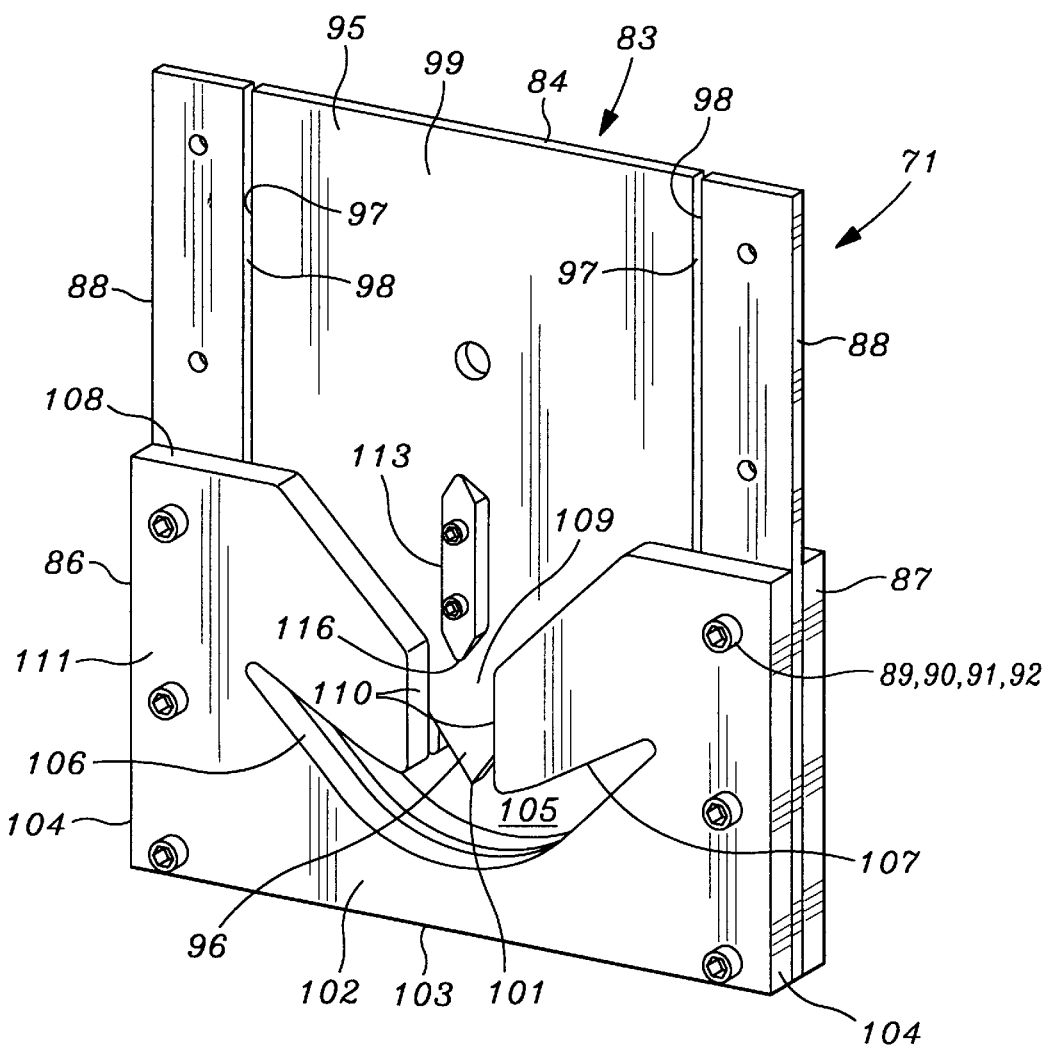
FIG. 12 is a fragmentary front perspective view of a guillotine portion of the apparatus of FIG. 10, showing the shear blade thereof in a partially elevated position after having sheared a length of vane stock.

As shown in FIGS. 9–11, shearing/forming mechanism 71 includes a guillotine-like shearing apparatus 83. The latter includes a shearing blade 84 vertically slidably supported in a shear blade support structure 85. As shown in FIGS. 10, 12 and 14, shear blade support structure 85 includes longitudinally spaced front and rear parallel blade support plates 86 and 87. Front and rear blade support plates 86 and 87 have in elevation view a generally rectangular shape and are held in a parallel, longitudinally spaced apart disposition by a pair of vertically disposed rectangular spacer bars 88 sandwiched between the blade support plates and located at the outer lateral edges of blade support structure 85. As may be seen best by referring to FIG. 9, blade support plates 86 and 87 are secured to spacer bars 88 and to each other by any convenient means, such as bolts 89 extending through aligned holes 90, 91 and 92 through front blade support plate 86, spacer bar 88, and rear plate 87, respectively, and secured with nuts 93 tightened onto the bolts.

Referring now to FIGS. 14 and 15, it may be seen that shear blade 84 comprises essentially a plate 94 of uniform thickness which has a laterally elongated rectangularly-shaped upper base section 95, and a triangularly-shaped piercing section 96 which depends downwardly from the base section. Upper base section 95 has a pair of laterally opposed parallel vertical side walls 97 which slidably contact the inner longitudinal faces 98 of spacer bars 88.

As may be seen best by referring to FIG. 14, triangularly-shaped piercing section 96 of shearing blade 84 is laterally symmetric about a vertical medial plane perpendicular to the front and rear faces 99 and 100 of the shearing blade. The apex 101 of piercing section 96 lies on the longitudinal center line of shear blade 84, and forms a piercing wedge for severing both front and rear airfoil plates of air turning vane stock, as will be described below. Piercing section 96 also has straight diagonal side walls 101-D which angle upwards and outwards from apex 101 to intersect upper base section 95, inwardly of side walls 97 of the base section.

Referring now to FIGS. 9 and 10, it may be seen that front and rear blade support plate sections 86 and 87 of shear blade support structure 85 each includes a lower base section 102 having a flat lower base wall 103, and a pair of laterally opposed, vertical side walls 104. As shown in FIGS. 9 and 10, the lower base section 102 of both front and rear shear blade support plate sections 86 and 87 has through its thickness dimension a crescent-shaped, or "smile"-shaped aperture 105. Each aperture 105, which is laterally elongated and symmetric about a vertical medial plane perpendicular to front and rear blade support plate sections 86 and 88, has a lower downwardly concave wall surface 106. Lower wall surface 106 is adapted to conformally and longitudinal slidably receive the front or lower convex surface 24 of front convex airfoil plate 23 of air turning vane stock C. Each aperture 105 also has an upper, downwardly convex wall surface 107, which is adapted to conformally and longitudinally slidably receive the rear or upper concave surface 26 of rear concave airfoil plate 25 of air turning vane stock C.

Figure 13:
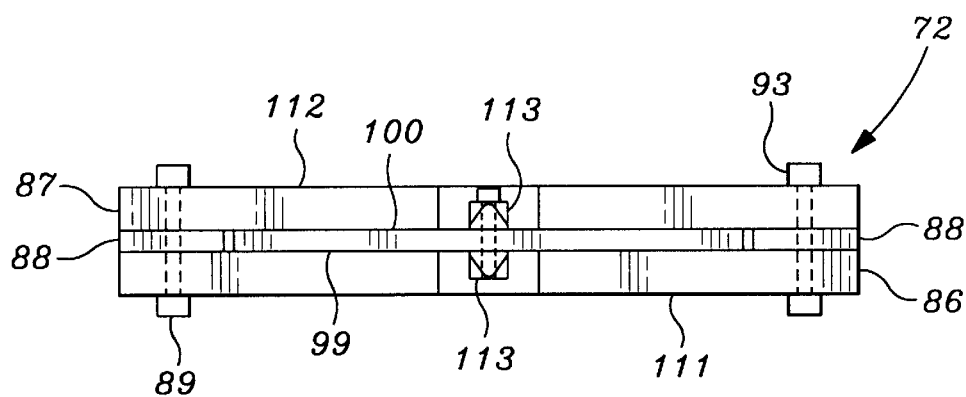
FIG. 13 is an upper perspective view of the structure of FIG. 12.

As may be seen best by referring to FIG. 13 in addition to FIG. 9 and 10, the upper edge wall 108 of lower base section 102 of front and rear shear blade support plate sections 86 and 87 has formed therein a centrally located, vertically elongated rectangular punch access slot 109, which extends downwardly and communicates with smile-shaped aperture 105 through upper edge wall 107 of the aperture. Punch access slot 109 has opposed, inner facing vertical side walls 110 which are disposed perpendicularly to front and rear side walls 111 and 112 of front and rear shear blade support plates 86 and 87. The lateral space between side walls 111 and 112 provide clearance for vertical movement of button-forming lancing punches 113 attached to front and rear surfaces 99 and 100 of shear blade 84, as explained below.

Referring now to FIGS. 14–16, button-forming lancing punches 113 may be seen to be longitudinally elongated bodies which protrude outwardly from front and rear parallel wall surfaces 99 and 100 of shear blade 84. As shown in FIG.

12, each lancing punch 113 has in front plan-view a radiused, downwardly protruding wedge-shaped point 116. Point 116 has the approximate plan-view shape of an isosceles triangle symmetrically disposed with respect to the longitudinal center line of shear blade 84, the triangle being inverted so its apex points downwardly. As shown in FIG. 15, point 116 of lancing punch 113 has a front or lower face 117 which angles longitudinally upwards and inwards from outer flat face 1 18 of the punch towards front face 99 of shear blade 84. Front or lower face 1 17 of punch 1 13 has an arcuately curved, convex shape. As is also shown in FIG. 15, outer face 118 of lancing punch 113 is preferably flat and parallel to front surface 99 of shear blade 84.

Referring now to FIGS. 14 and 16 in addition to FIG. 15, lancing punches 113 are preferably attached as a longitudinally aligned pair to front and rear surfaces 99 and 100 of shear blade 84. Thus, as shown in FIG. 15, a separate lancing punch 113 is fastened to each of front and rear shear blade surfaces 99 and 100 by means of two cap screws 119 which threadably engage a pair of longitudinally spaced apart threaded bores 120 through the punches and bores 121 through the shear blade.

As may be seen best by referring to FIG. 15, each button-forming lancing punch 113 is preferably symmetric about a transversely disposed medial plane. Thus constructed, when a first wedge-shaped point 116 of punch 113 becomes excessively worn, the punch may be removed, rotated 180 degrees, and re-attached to shear blade 84, thus presenting a fresh wedge-shaped point 116 in a downwardly directed, button-forming disposition.

As shown in FIGS. 8, 9, 10 and 11, shearing/forming apparatus 70 includes actuator means for sharply forcing shear blade 84 downwardly in shear blade support structure 85, and for returning the shear blade to an elevated position as shown in FIG. 12. The actuator means for shear blade 84 comprises a hydraulic or preferably a pneumatic linear force actuator, such as pneumatic actuator 121 shown in FIGS. 8, 9 and 10. Pneumatic actuator 121 includes a vertically oriented cylinder 122 which encloses a piston (not shown) having a downwardly protruding force actuator rod 123. As shown in FIGS. 8 and 10, force actuator rod 123 is coupled to the upper end of shear blade 84, as by a bolt 124. Preferably, pneumatic force actuator 121 is of a double acting type, in which pressurized air may be used to retract actuator rod 123 and shear blade 84 to an upright position after it has been moved downwards to shear vane stock C. Thus, as shown in FIG. 8, actuator 121 includes an upper, down-stroke pressurized air inlet port 125, and a lower, up-stroke pressurized air inlet port 126. Ports 125 and 126 are connected through hoses 127 and 128, respectively, to a valve bank 129, which in turn is connected to a source of pressurized air 130.

A method, according to the present invention, of severing double airfoil air turning vanes of a selected length from lengths of air turning stock, and for forming self-locking buttons in the vanes, may be best understood by referring to FIGS. 8, 9, 11 and 12.

As shown in FIGS. 8–11, a first step in producing air turning vanes 21 with self-locking buttons 54 and 55 includes placing a length of vane stock C in inlet feed channel 72, with front convex airfoil plate 23 of the vane feed stock resting on bottom wall 76 of the feed channel. Vane stock C is then slid forward on channel base wall 76 of inlet feed channel 72, beneath retainer flange 79, through smile-shaped aperture 105-R in rear shear blade support plate 87 and out through smile-shaped aperture 105-F in front shear blade support plate 86. Vane stock C is slid forward with respect to shear blade 85 sufficiently far for the forward transverse end of the vane stock to protrude from front face 99 of shear blade 84 a distance equal to the desired length of a finished air turning vane. Down-stroke air inlet port 125 of pneumatic actuator cylinder 122 is then supplied with a burst of pressurized air from source 130, via valve bank 129. Sharp downward motion of shear blade 84 in shear blade support structure 85 causes apex 101 of piercing section 96 of the shear blade to initially contact rear concave surface 26 of rear plate 25 of vane stock C, as shown in FIG. 13. Further downward motion of shear blade 84 causes apex 101 of shear blade piercing section 96, and diagonal walls 101-D which angle upwards and rearwards from the apex, to sever upper, rear airfoil plate 25 of vane stock C.

In an exactly similar fashion, further downward motion of piercing section 96 of shear blade 84 pierces and severs lower, front airfoil plate 23 of vane stock C. Still further downward motion of shear blade 84 causes button-forming lancing punches 113 to form a locking button 54 inwardly (forward) of rear severed transverse edge E of vane 20 protruding forward from apparatus 71, and a locking button 55 inwardly (rearward) of front severed transverse edge F of vane stock C. Thus, after severing rear and front airfoil plates 25 and 23, further downward motion of shear blade 84 causes lancing punches 113 protruding from front and rear surfaces 114 and 115 of the shear blade to move downwards between opposed vertical side walls 109 of punch access slots 110 provided in the front and rear shear blade support structure plates 86 and 87, respectively. The downward motion is continued until points 116 of lancing punches 113 encounter and penetrate rear vane plates 25 of both severed air turning vane 21 and severed air turning vane stock C. Penetration of rear vane plates 25 by lancing punch points 116 causes arcuately curved, generally hemispherically-shaped, button-like protuberances 54 and 55 to be formed in the rear airfoil plate, the curved shaped resulting from the radiused surface of the piercing point.

With locking buttons 54 and 55 formed inwards of the severed edges of vane 21 and vane stock C, respectively, as described above, valve bank 129 is operated to remove pressurization of upper, down-stroke air inlet port 125 of pneumatic actuator 121, and to admit pressurized air to lower, up-stroke air inlet port 126 of the pneumatic actuator. These actions cause shear blade 84 to move rapidly upwards within shear blade support structure 85, to a position in which the shear blade is located above rear plates 25 of vane stock C and vane 21. With clearance thus provided between shear blade 84 and both vane stock C and severed vane 21, the vane stock may once again be pushed forwards through front smile-shaped aperture 105 to extend a distance required to make another vane of a selected length. Pushing vane stock C forward also causes the previously severed and formed vane 21 to move forward in output channel 73. Since output channel 73 has three walls and an open side, finished vanes 21 may be readily rolled sideways to drop into a collection receptacle.

What is claimed is:

1. An apparatus for making a locking protuberance in a longitudinally elongated air turning vane of the type including at least a first elongated plate having first and second parallel wall surfaces, said apparatus comprising;
   a. vane holder means for longitudinally insertably receiving and supporting said air turning vane, and
   b. punch means movable transversely to said air turning vane, said punch means being adapted to impact said first parallel wall surface of said plate with sufficient force to permanently deform from said second parallel wall surface of said plate material having the desired shape of said locking protuberance.

2. An apparatus for making a self-locking air turning vane having therein a locking protuberance from an elongated length of vane stock including at least a first longitudinally elongated vane plate having first and second parallel wall surfaces, said apparatus comprising;

a. vane stock holding means for longitudinally receiving and supporting a length of said vane stock, b. severing means for severing from said vane stock a vane plate of a desired length, and c. punch means movable transversely to said vane stock, said punch means being adapted to impact said first parallel wall surface of said vane plate with sufficient force to permanently deform from said second parallel wall surface of said vane plate material having the desired shape of said locking protuberance.

3. The apparatus of claim 2 wherein said severing means is further defined as a shear blade movable transversely to a longitudinal axis of said vane stock to thereby impact and sever said vane stock.

4. The apparatus of claim 3 wherein said shear blade is further defined as having front and rear parallel transverse surfaces, and a pointed vane stock piercing tip for piercing said vane stock.

5. The apparatus of claim 4 wherein said punch means is further defined as a first lancing punch fastened to said front parallel transverse surface of said shear blade, said lancing punch having a downwardly protruding convex point located upwardly from said piercing tip of said shear blade, said lancing punch being effective in forming a locking protuberance forward from a rear edge of said vane stock severed by said shear blade.

6. The apparatus of claim 5 further including a second lancing punch fastened to said rear parallel transverse surface of said shear blade in longitudinal alignment with said first lancing punch, said second lancing punch being effective in forming a locking protuberance rearward from a front transverse edge of said vane stock severed by said shear blade.

7. The apparatus of claim 6 wherein said first vane plate severed from said vane stock is further defined as being arcuately bowed about a longitudinal axis of said plate.

8. The apparatus of claim 7 wherein said vane stock holding means is further defined as comprising longitudinally spaced apart, front and rear support plates having through the thickness dimension thereof longitudinally aligned apertures adapted to longitudinally slidably receive said vane stock.

9. The apparatus of claim 8 wherein said shear blade is further defined as being transversely slidably supported between said support plates.

10. The apparatus of claim 9 wherein said vane stock is further defined as including a second arcuately bowed vane plate fastened at longitudinal margins thereof to said first vane plate.

11. The apparatus of claim 10 wherein said second arcuately bowed vane plate is further defined as having a smaller radius of curvature than that of said first arcuately bowed plate.

12. The apparatus of claim 11 wherein each of said first and second lancing punches is further defined as being so located with respect to a downward transverse travel limit of said shear blade relative to said vane stock as to pierce at least a portion of said vane blade contacted by a said lancing punch.

13. The apparatus of claim 12 wherein each of said first and second lancing punches is further defined as having in front plan view a downwardly convex shape which is symmetrical about a longitudinal medial plane of said shear blade, and having in side elevation view an inclined lower surface which angles downwardly and outwardly from a face of said shear blade to an outer face of said punch.

14. The apparatus of claim 13 wherein said punch is further defined as being of a shape which forms in said vane plate a locking protuberance having proximate a transverse edge of said vane plate severed by said shear blade an arcuately curved shell and a distal lip which transversely truncates said curved shell.

\* \* \* \* \*